July 6, 1937.  H. M. STOLLER  2,086,101

SYNCHRONIZATION OF ENGINES

Filed March 14, 1936

INVENTOR
H. M. STOLLER
BY
Wayne B Wells
ATTORNEY

Patented July 6, 1937

2,086,101

UNITED STATES PATENT OFFICE 2,086,101

SYNCHRONIZATION OF ENGINES

Hugh M. Stoller, Mountain Lakes, N. J., assignor to Bell Telephone Laboratories, Incorporated, New York, N. Y., a corporation of New York Application March 14, 1936, Serial No. 68,892

6 Claims. (Cl. 60—97)

This invention relates to the synchronization of internal combustion engines and particularly to the synchronization of airplane engines.

One object of the invention is to provide a number of interconnected internal combustion engines that shall operate in synchronism when jointly operated and be capable of individual operation.

Another object of the invention is to provide a number of internal combustion engines with interconnections between the exhaust manifolds thereof that shall insure synchronous operation of the motors in a fixed phase relation.

A further object of the invention is to provide an airplane with internal combustion engines having the exhaust manifolds interconnected for equalizing the back pressure on the engines to maintain the engines in synchronism.

The engines on an airplane when operating out of synchronism or when operating nearly in synchronism and not in fixed phase relation will develop a low frequency beat both in noise and in mechanical vibration within the airplane. The low frequency noise is very annoying to persons riding on an airplane and much more so than a steady noise. The low frequency mechanical vibration produces stresses which tend to weaken the airplane structure.

According to the present invention an airplane having, for example, two internal combustion engines is operated so that the two engines operate at substantially the same speeds. The speed of each motor may be controlled by adjustment of the throttle. The loads carried by the individual motors should be equalized so that each motor carries its portion of the load. The equalization of the loads carried by the engines may be effected by adjustment of the pitch of the propellers connected to the engines. The patent to Alfred Vischer, Jr. 1,985,391, December 25, 1934 discloses means for adjusting the pitch of propeller blades. In the above manner the engines may be operated at substantially the same speeds with substantially the same loads. With the engines of the airplane so connected and operated a cross pipe is connected between the two exhaust lines from the engines. The cross pipe is preferably connected to the exhaust lines adjacent to the exhaust manifolds. The back pressure in the exhaust lines would be equalized by the cross pipe so that as more fully explained hereinafter a weak synchronizing tie is provided between the two engines.

Figure 1:
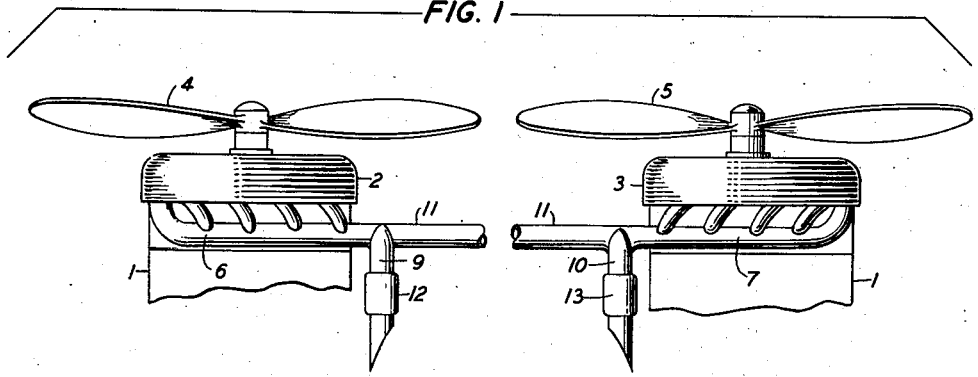

Fig. 1 in the accompanying drawing is a diagrammatic view of an airplane provided with radial engines controlled in accordance with the invention.

Figure 2:
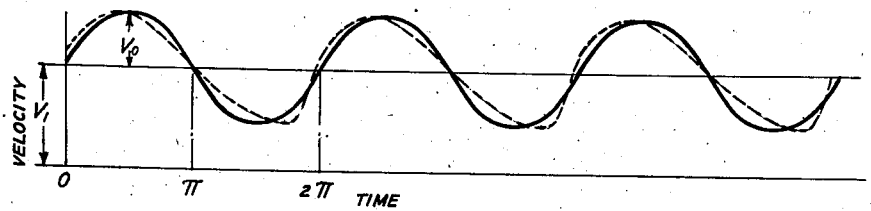
Figure 3:
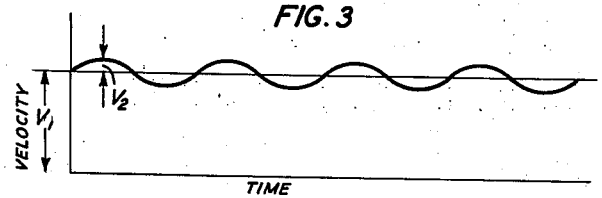

Figs. 2 and 3 are velocity curves illustrating the action of the exhaust gases.

Referring to the drawing, an airplane 1 is provided with two internal combustion engines 2 and 3. Two propellers 4 and 5 are respectively connected to the two engines 2 and 3. The two engines 2 and 3 are respectively provided with exhaust manifolds 6 and 7 which are connected to the exhaust pipes 9 and 10. Between the two exhaust pipes 9 and 10 and the exhaust manifolds 6 and 7 is connected a cross pipe 11. The exhaust pipes 9 and 10 will in most cases provide sufficient back pressure for acting on the cross pipe 11 to insure equalization of the back pressure on the engines 2 and 3. If sufficient back pressure is not provided by the exhaust pipes 9 and 10 then mufflers 12 and 13 may be provided in the exhaust pipes 9 and 10.

In the above construction the engines 2 and 3 are assumed to operate at substantially the same speeds so that the engines normally operate nearly in synchronism. This control of the engines may be effected in any well-known manner as, for example, by throttle control. It is also assumed that the loads on the engines are substantially equal. The loads on the engines may be equalized by adjusting the pitch of the propellers 4 and 5 in any well-known manner.

In an airplane having two engines each comprising seven cylinders each developing 500 horsepower and rotating at 1800 revolutions per minute the explosions by each engine will be 3½ per revolution or 105 explosions per second. The velocity in each exhaust pipe 9 and 10 will have a strong 105 cycle component the peak value of which we may assume to be 50% of the average mean velocity.

The dotted curve in Fig. 2 shows the variations in velocity of the exhaust gases passing through the muffler. After each explosion of the engine the pressure rises corresponding to the ascending portion of the curve and then falls between explosions in the descending portion. This curve may be resolved into a fundamental sine wave plus higher harmonics. Since the higher harmonics contain but a small energy component and since the analysis of the problem is simplified by dealing with sine waves, it will be satisfactory to consider the velocity curve as consisting of an average velocity $V_1$ plus a sinusoidal component $V_0 \sin \theta$. This $V = V_1 + V_0 \sin \theta$. The frequency of these sinusoidal pulsations is determined by the number of explosions per second of the engine. The flow of the exhaust gases through the muffler results in a loss of energy. The principal component of this energy is that required to accelerate the gases up to the required velocity, the energy per unit volume of gas being represented by $MV^2$ where $M$ is the mass of the gas and $V$ its velocity. Since the volume of gas passing through the muffler in a given length of time is also proportional to the velocity, the total energy loss in the muffler per unit time is proportional to the cube of the velocity. Thus the energy loss per cycle is $$E_1 = \int_0^{2\pi} (V_1 + V_0 \sin \theta)^3 d\theta$$

$$E_1 = \int_0^{2\pi} (V_1^3 + 3V_1^2 V_0 \sin \theta + 3V_1 V_0^2 \sin^2 \theta + V_0^3 \sin^3 \theta) d\theta$$

$$E_1 = \left[ V_1^3 \theta - 3V_1^2 V_0 \cos \theta + 3V_1 V_0^2 \left(\frac{1}{2}\theta - \frac{1}{4}\sin 2\theta\right) - \frac{1}{3}V_0^3 \cos \theta (\sin^2 \theta + 2) \right]_0^{2\pi}$$

$$E_1 = \left[ 2\pi V_1^3 - 3V_1^2 V_0 + 3V_1 V_0^2 (\pi) - \frac{2}{3}V_0^3 \right] - \left[ 0 - 3V_1^2 V_0 - \frac{2}{3}V_0^3 \right] \quad (1)$$

$$E_1 = 2\pi V_1^3 + 3\pi V_1 V_0^2$$

It will be seen from Equation (1) that the energy losses in a muffler are proportional not only to the average velocity $V_1$ of the exhaust gases but also are increased if the pulsation of velocity $V_0$ is appreciable relative to that of $V_1$. Referring now to the proposed combination of two engines, each having a muffler and the use of a cross-connecting pipe between the entrances of the mufflers, let us consider two cases; one in which the explosions of the two engines occur at the same instant (Case 1), and where they interleave (Case 2). Referring to Case 1, if engines 2 and 3 are identical in every respect, the corresponding pressures in their mufflers at any instant will be identical and there will be no flow of exhaust gases over the cross pipe. Therefore, in this case each muffler will have the velocity-time curve of Fig. 2 and the total energy loss of the two mufflers will be $$2E_1 = 2[2\pi V_1^3 + 3\pi V_1 V_0^2]$$

Considering Case 2 where the explosions of engines 2 and 3 interleave, it is obvious that the instants of maximum pressure in the exhaust line of engine 2 will correspond approximately to instants of minimum pressure in the exhaust line of engine 3 and vice versa. It is thus evident that there will be an alternating flow of gas along the cross pipe at a frequency double that of the explosion rate of either engine. The velocity-time curve for either muffler will therefore be as shown in Fig. 3, the average velocity $V_1$ being the same as in Fig. 1, but the pulsating velocity component $V_2$ will be smaller than $V_0$ of Fig. 1 and of twice the frequency. This smoothing out of the velocity peaks will be due to the fact that the flow of gas along the cross pipe will cut down the peak velocity of one muffler at the same instant that it will raise the minimum velocity in the other muffler. The energy loss in the case of Fig. 3 is obtained by substituting $V_2$ for $V_0$ in Equation (1), thus $$E_2 = 2\pi V_1^3 + 3\pi V_1 V_2^2$$

and for the two mufflers $$2E_2 = 2[2\pi V_1^3 + 3\pi V_1 V_2^2]$$

But since $V_2$ is small compared to $V_0$, $E_2$ will be less than $E_1$ or in other words, the total muffler losses will be reduced in Case 2 as compared with Case 1. Assuming the quantitative relations are in proportion to the scales of Fig. 2 and Fig. 3, where $$V_2 = \frac{1}{3} V_0$$

and $$V_0 = \frac{1}{2} V_1$$

the energy loss in Case 2 will be about 75 per cent of that in Case 1. Therefore, since the exhaust gases will seek the path of least resistance, and since the phase relation of the engine explosions affects such resistance and is free to shift, the engines will tend to synchronize in practical operation as in Case 2. Under operating conditions an equilibrium phase position is reached, which will differ from the exact position of Case 2 by a small phase angle proportional to the difference in power developed by the two engines. However, since the total energy losses in the muffler system are small compared to the engine output, this interlocking force will be rather weak; of the order of 1 to 2 per cent and synchronization will therefore be secured only over a very limited range of throttle adjustment. This result is a desirable one from an operating standpoint as it permits a virtual independence of control of the engines and it allows them to drop out of step when the airplane makes a turn which momentarily alters the relative load on the two engines.

It will also be noted that the use of the cross pipe actually will reduce the total muffler losses and will, therefore, increase the mechanical power output of the engines a minute amount, instead of involving some sacrifice of engine output as is the case with some other synchronization means.

Modifications in the apparatus and in the arrangement and location of parts may be made within the spirit and scope of the invention and such modifications are intended to be covered by the appended claims.

What is claimed is:

1. In an aircraft, a plurality of internal combustion engines each having an exhaust manifold and operated at substantially the same speeds, propellers connected to said engines having their pitches so adjusted that the engines may be operated at the same speeds and each develop the same driving power, and means comprising a direct gas connection between the manifolds of said engines subjected only to the pressures caused by the engine exhaust gases operating against the friction of the exhaust conduit for so equalizing the back pressures on the cylinders of the engines as to exert a force tending to hold the engines in synchronism and insure alternate explosions between the engines.

2. In an aircraft, a plurality of internal combustion engines of the radial type each having an exhaust manifold and operated at substantially the same speeds, adjustable propellers connected to said engines having their pitches so adjusted that the engines may be operated at the same speeds and each develop the same driving power, and means comprising a direct equalizing connection between the exhaust manifolds of said engines subjected only to the pressures caused by the engine exhaust gases operating against the friction of the exhaust conduit for producing a synchronizing tie between the engines of relatively low power so that independent control of the engines under emergency conditions may be effected.

3. In an aircraft, two internal combustion motors for propelling the aircraft, each of said motors having an exhaust manifold and an exhaust pipe connected to the exhaust manifold, and a direct equalizing connection between said exhaust pipes adjacent to the connections of the exhaust pipes to the exhaust manifolds subjected only to the pressures caused by the engine exhaust gases operating against the friction of the exhaust conduit for equalizing the back pressures on the engines to provide a synchronizing force tending to hold the two engines in a fixed phase relation so that the explosions from one engine are spaced midway between the explosion of the other engine.

4. In an aircraft, two internal combustion engines having exhaust manifolds and operating at substantially the same speeds, propellers connected to said engines having their pitches so adjusted that the engines may be operated at the same speeds and develop the same driving power, and means comprising a direct gas connection between said exhaust mainfolds having the gases therein subjected only to the pressures caused by the engine exhaust gases operating against the friction of the exhaust conduit for equalizing the back pressures on the cylinders of the two engines to hold the two engines in synchronism and insure alternate explosions between the engines.

5. In an aircraft, two internal combustion engines of the radial type each having an exhaust manifold and operated at substantially the same speeds, adjustable propellers connected to said engines having their pitches so adjusted that the engines may be operated at the same speeds and each develop the same driving power, and means comprising a direct equalizing connection between the exhaust manifold of one engine and the exhaust manifold of the other engine subjected only to the pressures caused by the engine exhaust gases operating against the friction of the exhaust conduit for producing a synchronizing tie between the two engines of relatively low power so that independent control of the engines under emergency conditions may be effected.

6. In an aircraft, two internal combustion engines having exhaust manifolds and operating at substantially the same speeds, propellers connected to said engines having their pitches so adjusted that the engines may be operated at the same speeds and develop the same driving power, and means comprising a direct gas connection between said manifolds having the gases therein subjected only to the pressures caused by the engine exhaust gases operating against the friction of the exhaust conduit for equalizing the pressure on the engines to hold the phase relation of two engines substantially constant and insure alternate explosions between the engines.

HUGH M. STOLLER.